Jan. 25, 1944. D. G. SMELLIE Re. 22,426

SUCTION CLEANER

Original Filed Dec. 13, 1939

INVENTOR

Donald G. Smellie

BY

Harry S. Duncan

ATTORNEY

Reissued Jan. 25, 1944

Re. 22,426

UNITED STATES PATENT OFFICE 22,426

SUCTION CLEANER

Donald G. Smellie, Canton, Ohio, assignor to The Hoover Company, North Canton, Ohio, a corporation of Ohio Original No. 2,260,236, dated October 21, 1941, Serial No. 308,914, December 13, 1939. Application for reissue October 1, 1942, Serial No. 460,394

16 Claims. (Cl. 15—16)

The present invention relates to suction cleaners in general and more particularly to a new and novel suction cleaner embodying sound-deadening or absorbing means.

It is an object of the present invention to provide a new and improved suction cleaner. It is another object of the invention to provide a new and improved suction cleaner characterized by reduced noise of operation. Still another object of the invention is to provide, in a suction cleaner of the type in which the dirt-filtering bag is supported at its upper end by the pivoted cleaner handle, sound-absorbing means which extend into the bag and are so mounted as to improve the relationship of the bag to the cleaner body. A still further object of the invention is to provide a suction cleaner construction in which the dust bag carried by the pivoted handle is connected through the sound-absorbing muffler and its fixed pivotal connection to the cleaner body. A further object of the invention is to provide a suction cleaner in which the sound-absorbing muffler is connected to the exhaust outlet of the cleaner by means of a collapsible bellows and rigid means pivoted upon an horizontal axis. These and other more specific objects will appear upon reading the following specification and claims and upon considering in connection therewith the attached drawing to which they relate.

Referring now to the drawing in which a preferred embodiment of the present invention is disclosed:

Figure 1:
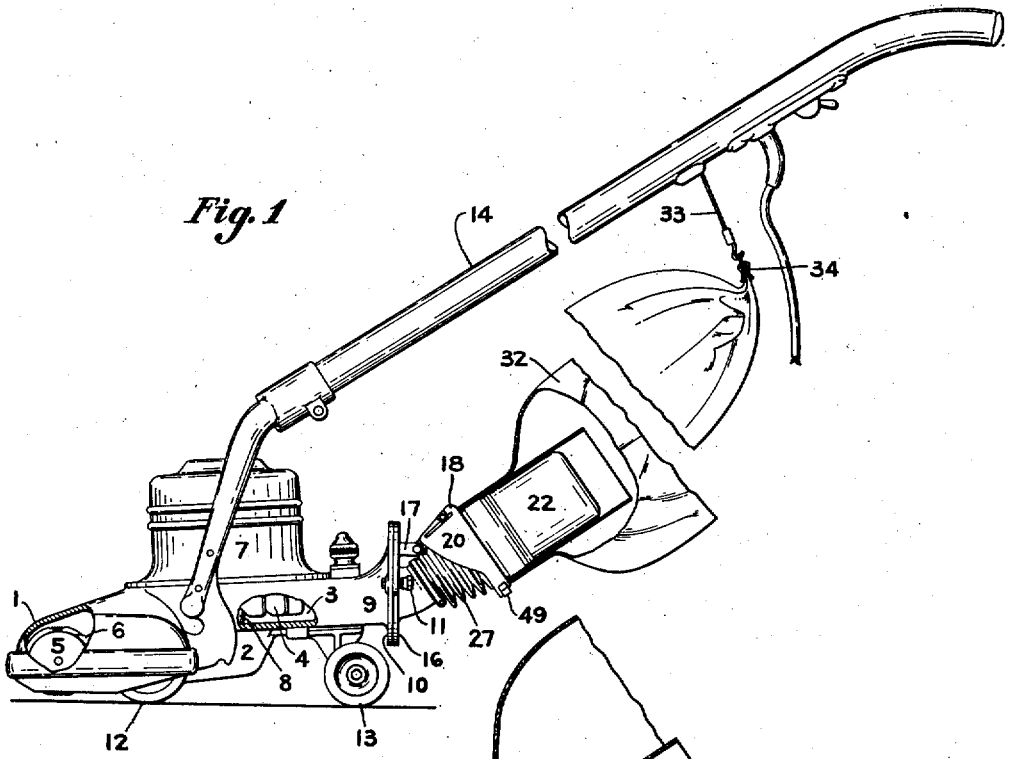
Figure 1 is a side elevation of a modern suction cleaner embodying the present invention.

In the modern suction cleaner the noise of cleaner operation has been greatly reduced by numerous refinements until today a large part of the audible sounds are discharged into the ambient by means of the exhausted air from the cleaner. The removal of the sound vibrations in this exhausted air is accomplished in the present invention by a new and improved construction which has the advantage of providing an improved connection between the cleaner bag and the cleaner body.

Referring again to the drawing, a suction cleaner is disclosed which is seen to comprise a nozzle 1 which is interiorly connected by an air passageway 2 to a fan chamber 3 housing a suction-creating fan. Within the nozzle 1 is positioned a rotary agitator 5 which is driven through a power-transmitting belt 6 by suitable means which includes an unshown motor positioned within a motor casing 7, immediately over fan chamber 3, the shaft 8 of which extends downwardly through the fan chamber where it carries the suction-creating fan 4. The fan chamber 3 is provided with an exhaust outlet 9 formed with a rear flange 10 to which the bag and muffler unit, hereinafter described, is removably secured by means of a manually operable securing element 11. The cleaner body is movably supported by means of the front and rear wheels 12 and 13, respectively, and, as in the usual cleaner, a pivoted handle 14 is provided by which the operator can exert a propelling force.

Figure 2:
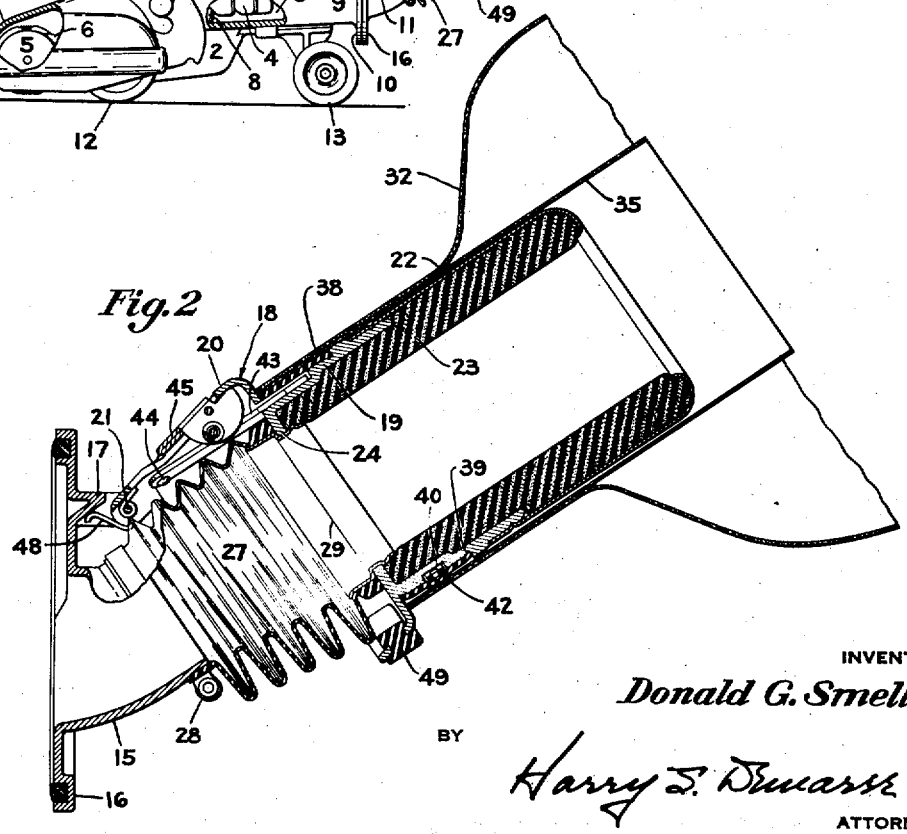
Figure 2 is an enlarged section through the cleaner muffler and bag unit.

The bag and muffler unit is seen to comprise a connector 15 formed in its principal body portion as a conduit, there being a transversely extending flange 16 at the entrance of the conduit which is adapted to abut and be secured to the cleaner exhaust flange 10 by the manually operable securing means 11. Connector 15 is formed above its conduit body portion with a rearwardly extending supporting bracket or arm 17 to which the lower rigid casing section 18 of the muffler is pivotally mounted. Section 18 comprises an outer cylindrical body portion 19 and an enlarged head portion 20 preferably shaped as illustrated in Figures 1 and 2, which is pivoted by means of a pin 21 upon the supporting bracket 17. An outer metallic, cylindrical body section 22 seats upon the cylindrical body portion 19 of section 18 and extends therebeyond, substantially as a continuation, being formed at its outer end with an inwardly curved rim or face. Seated within the rigid body, formed by 19 and 22 is a cylinder of sound-absorbing material such as sponge rubber, indicated at 23, which is confined against outward displacement by the inwardly turned end of cylinder 22 and against inward displacement by the inturned flange 24 formed upon section 18 at the junction of the head portion 20 and the upper portion 19.

The passageway through the sound-absorbing body portion or lining 23 is connected to the conduit body portion of connector 15 by means of an expansible contractible bellows 27 which is preferably made of rubber or some similar resilient material and which comprises a plurality of circular corrugations or pleats which are of greater depth at the bottom than at the top. The bellows is clamped to the conduit-body of connector 15 by a suitable encircling spring clamp 28, and is connected to the muffler through encircling and gripping a seating ring 29 carried by the inwardly extending flange 24 of the section 18. The lower end of the ring 29 is slightly out-turned to prevent the bellows slipping off.

The cylindrical muffler body formed by 18 and 22 is adapted to receive and seat the inlet or mouth of a suction cleaner filter bag which, in the drawing, is indicated by the reference character 32 and is seen to be of the usual shape and supported at its upper end by a supporting strap 33 and a channel member 34 which closes the upper end of the bag. At the neck of the bag is a cylindrical sleeve 35 which, like the bag itself, is preferably made of paper but of a stiffer variety and which is of a size adapted closely to enclose the muffler body. The retaining means which secure the lower end of the bag in place upon the muffler, as illustrated, is disclosed and claimed in the co-pending application, Serial No. 283,326, filed by Harry B. White, July 8, 1939, and is not per se the present invention. Briefly, the securing means comprises a rubber ring or sleeve 38 which seats within a peripheral recess 39 in the muffler cylindrical body portion 19, closely enclosing that element by its own resiliency. Within and under the rubber ring 38, and seated in a peripheral groove 40 of even smaller diameter, are expansible rings 42 which are provided with one or more lever arms 43 pivoted within the muffler head section 20 at 44. Rings 42 are illustrated in Figure 2 in the sleeve-expanding, bag-retaining relationship. Normally the expansible rings do not expand the rubber ring or sleeve 38 except upon the expanding movement of the lever arm 43 which is accomplished by the manual pivoting of a pivoted lever arm 45 from an outstanding radial position to that shown in Figure 2. The lever arm is shown in its lower position in Figure 2 and the expansible rings have been expanded to expand the retaining rubber sleeve 38 to secure the neck of the bag 32 in place. The exact construction of this retaining means is not of the essence of this invention but is instead claimed in the copending application mentioned.

The construction is completed by the presence of a coil spring 48 and a resilient bumper 49. The spring 48 encircles the pivot pin 21 of the muffler and bag construction and is in contact at one of its ends with the head 20 of the muffler and at its opposite end with the arm 17 of the connector. Spring 48 functions at all times to exert an upwardly pivoting force upon the muffler unit. The bumper 49, which may be of rubber, is carried by the lower casing section 18 of the muffler body on its underside, being so positioned as to contact articles of furniture etc. which are struck by the cleaner when moving in a rearward direction. In operation the cleaner constructed in accordance with the present invention is propelled back and forth across the surface covering undergoing cleaning by the operator exerting a propelling force through the cleaner handle 14. As the machine is reciprocated the angular position of the handle relative to the cleaner body changes and as it changes the upper end of the dust bag 32 is raised and lowered effecting a change in bag angularity. With the cleaner constructed in accordance with the present invention this change in angularity is accomplished by the pivotal movement of the bag and the muffler construction about the pivotal axis 21, the relative movement being accommodated by the expansion and compression of the bellows 27. The coil spring 48 at the pivotal axis serves at all times to exert a lifting force upon the bag and muffler which tends to offset the weight thereof, thereby reducing the lifting effect necessary from the operator. In the operation of the cleaner, the cleaning air laden with foreign material is exhausted from the cleaner exhaust 9 through the bellows 27 and the muffler and into the bag. As it passes through the sound-absorbing material 23 the sound waves therein are reduced and absorbed and the air is exhausted into the bag proper in a quieted condition producing a quieter operation of the cleaner. Bag replacement is accomplished by pivoting the manually operable lever 45 outwardly, whereupon the rings 42 move inwardly, the resilient sleeve 38 contracts, and the bag neck can be slid off the cylindrical muffler body. The insertion of a new or cleaned bag is exactly the reverse operation.

I claim:

1. In a suction cleaner comprising a body formed with an exhaust outlet and suction-creating means to exhaust dirt-laden air through said outlet, a handle pivotally connected to said body, a dirt-filtering bag supported at its upper end from said handle and formed at its lower end with a reduced neck portion, a sound-absorbing muffler detachably seating said bag, rigid means pivotally mounting said muffler to said exhaust outlet about an horizontal axis fixed relative to the cleaner body to enable said muffler to move relative to said body under forces transmitted through said bag from the handle, and means including an expansible-contractible accordion-like rubber tube interiorly connecting said muffler to said exhaust outlet in all positions of the former.

2. In a suction cleaner comprising a body formed with an exhaust outlet and suction-creating means to exhaust dirt-laden air through said outlet, a handle pivotally connected to said body, a dirt-filtering bag supported at its upper end from said handle and formed at its lower end with a reduced neck portion, a sound-absorbing muffler detachably seating said bag, rigid means pivotally mounting said muffler to said exhaust outlet about an horizontal axis fixed relative to the cleaner body to enable said muffler to move relative to said body under forces transmitted through said bag from the handle, and means including an expansible-contractible rubber bellows positioned at one side of and below the pivotal axis of said rigid pivotal mounting means and interiorly connecting said muffler to said exhaust outlet in all positions of the former.

3. A suction-cleaner bag and muffler unit comprising a connector adapted to be detachably secured to the exhaust outlet of a suction cleaner and including a body-conduit portion, a sound-absorbing muffler pivoted about a fixed axis on said connector, an expansible-contractible bellows connecting the interiors of said muffler and said body-conduit portion, and a dust bag removably seated on said muffler.

4. A suction-cleaner bag and muffler unit comprising a connector adapted to be detachably secured to the exhaust outlet of a suction cleaner and including a body-conduit portion, a sound-absorbing muffler including a rigid body and sound-absorbing material, rigid means pivotally mounting the muffler body for limited pivotal movement about a fixed axis on said connector, an expansible-contractible resilient connection between said muffler and said connector, and a dust bag seated on said muffler.

5. A suction-cleaner bag and muffler unit comprising a connector adapted to be detachably secured to the exhaust outlet of a suction cleaner and including a body-conduit portion, a cylindrical sound-absorbing muffler aligned with the body-conduit portion of said connector, rigid means pivotally connecting said muffler to said connector for movement about an axis above said body-conduit portion, spring means urging said muffler upwardly about said pivotal axis, expansible-contractible resilient means connecting said muffler to said body-conduit portion, and a dust bag removably seated on said muffler.

6. A suction-cleaner bag and muffler unit comprising a connector adapted to be detachably secured to the exhaust outlet of a suction cleaner and including a body-conduit portion, a sound-absorbing muffler including a rigid body, rigid means pivotally mounting said rigid muffler body on said connector and preventing relative movement therebetween except about the pivotal axis, expansible-contractible resilient means connecting said muffler to said body-conduit portion, manually operable bag-seating-and-securing means on said muffler, and a dust bag removably seated on said muffler.

7. In a suction cleaner, an ambulant body including a nozzle and an exhaust outlet, a sound-absorbing muffler pivotally connected to said exhaust outlet by means of an expansible-contractible bellows and by rigid pivotally related means adjacent and at the side of said expansible-contractible means, and bag-retaining means movable with said muffler.

8. In a suction cleaner, an ambulant body, a propelling handle pivotally connected thereto, a suction nozzle, suction-creating means connected thereto, an exhaust outlet to convey dirt-laden air from said means, a dirt-filtering bag to receive air from said outlet supported at its upper end by said handle, a muffler structure including an acoustic absorption means positioned within said bag, means to connect interiorly said bag and muffler to said exhaust outlet to receive air therefrom including a flexible connection in the form of a bellows structure movably supporting said muffler whereby said muffler may be displaced readily by a force transmitted through the bag from the handle in pivoting, and rigid means at one side of said bellows limiting bag and muffler movement to a pivotal movement about a fixed axis.

9. In a suction cleaner muffler and bag-mounting construction, a muffler including bag-seating means, a seating member adapted to be seated upon the exhaust outlet of a suction cleaner to which said muffler is pivoted for movement about a fixed axis, and expansible-contractible resilient means between said muffler and said seating member to connect interiorly said muffler to an exhaust outlet.

10. A suction cleaner muffler and bag-mounting construction comprising a connector adapted to be detachably seated upon the exhaust outlet of a suction cleaner, a muffler including bag-seating means adapted to receive the mouth of a suction cleaner dust bag, a rigid pivotal connection between said muffler and said connector, and expansible-contractible means interiorly connecting said connector and said muffler.

11. A suction cleaner muffler and bag-mounting construction comprising a tubular connector adapted to be detachably seated upon the exhaust outlet of a suction cleaner, a muffler including a rigid cylindrical body portion and an adjacent sound-absorbing body, bag-seating-and-retaining means on said body portion, a rigid pivotal connection between said muffler and said connector, and an expansible-contractible tubular bellows interiorly connecting said muffler and said connector.

12. A suction cleaner muffler and bag-mounting construction comprising a connector adapted to be detachably seated upon the exhaust outlet of a suction cleaner, a muffler including bag-seating means adapted to receive the mouth of a suction cleaner dust bag, a rigid pivotal connection between said muffler and said connector, expansible-contractible means interiorly connecting said connector and said muffler, and resilient means exerting a force to counterbalance the effect of gravity acting to pivot said muffler about its pivotal axis.

13. A suction cleaner muffler and bag-mounting construction comprising a connector adapted to be detachably seated upon the exhaust outlet of a suction cleaner, a muffler including bag-seating means adapted to receive the mouth of a suction cleaner dust bag, a rigid pivotal connection between said muffler and said connector, expansible-contractible means interiorly connecting said connector and said muffler, and a spiral coil spring at said pivotal connection exerting a force on said muffler to counterbalance the effect of gravity acting thereon.

14. In a suction cleaner, a body including an exhaust outlet, a muffler including sound-absorbing means movably mounted on said outlet and extended therefrom, means interiorly and movably connecting said muffler to said body and to said outlet including an expansible bellows, a dust bag seated on said muffler and movable therewith relative to said body, resilient means between said body and said muffler exerting a lifting force on said muffler tending to pivot it upwardly to counterbalance the effect of gravity on said muffler and bag, and manually operable means carried permanently on said muffler detachably securing said bag in place.

15. In a suction cleaner a body including an exhaust outlet, a muffler including sound-absorbing means pivotally mounted on said outlet and extended therefrom, a coil spring at the pivot point of said muffler exerting a lifting force thereon in all angular positions of the muffler, and a removable dust bag connected to said muffler in communication with the interior thereof.

16. In a suction cleaner of the type having a body including an exhaust outlet, a muffler including sound-absorbing means connected to said outlet in communication therewith and extended therefrom, means movably mounting said muffler on said outlet, a dust bag detachably seated on said muffler, and resilient means between said body and said muffler to exert a force on the exhaust outlet to lift said muffler to counterbalance the effect of gravity on said muffler and bag.

DONALD G. SMELLIE.